US012593827B2

(12) United States Patent
Den Uijl et al.

(10) Patent No.: US 12,593,827 B2
(45) Date of Patent: Apr. 7, 2026

(54) MONITORING SYSTEM FOR INDIVIDUAL GROWTH MONITORING OF LIVESTOCK ANIMALS

(71) Applicant: LELY PATENT N.V., Maassluis (NL)

(72) Inventors: Ingrid Elisabeth Maria Den Uijl, Maassluis (NL); Markéta Juzlová, Prague (CZ); Tibor Szolár, Prague (CZ)

(73) Assignee: LELY PATENT N.V., Maassluis (NL)

( * ) Notice: Subject to any disclaimer, the term of this patent is extended or adjusted under 35 U.S.C. 154(b) by 328 days.

(21) Appl. No.: 18/576,690

(22) PCT Filed: Jul. 11, 2022

(86) PCT No.: PCT/IB2022/056385
§ 371 (c)(1),
(2) Date: Jan. 4, 2024

(87) PCT Pub. No.: WO2023/285945
PCT Pub. Date: Jan. 19, 2023

(65) Prior Publication Data
US 2024/0306609 A1     Sep. 19, 2024

(30) Foreign Application Priority Data

Jul. 16, 2021     (NL) ..................................... 2028749

(51) Int. Cl.
*A01K 29/00*          (2006.01)
*A01K 1/00*          (2006.01)
(Continued)

(52) U.S. Cl.
CPC .......... *A01K 29/005* (2013.01); *A01K 1/0088* (2013.01); *G06T 7/60* (2013.01); *G06T 7/73* (2017.01); *G06T 2207/10028* (2013.01)

(58) Field of Classification Search
CPC ...... A01K 29/005; A01K 1/0088; G06T 7/73; G06T 7/60; G06T 2207/10028
See application file for complete search history.

(56) References Cited

U.S. PATENT DOCUMENTS

2016/0295838 A1* 10/2016 Van Der Kamp ........ G06T 7/62
2020/0410669 A1* 12/2020 Psota .................... G06T 7/0012
2021/0004577 A1* 1/2021 Amat Roldan ........ A01K 29/00

FOREIGN PATENT DOCUMENTS

NL            2011952 C      6/2015
WO      WO 2015/088329 A1      6/2015
WO      WO-2020260631 A1 * 12/2020 ............. A01K 29/00

OTHER PUBLICATIONS

Guo, H., Ma, X., Ma, Q., Wang, K., Su, W., & Zhu, D. (2017). LSSA_CAU: An interactive 3d point clouds analysis software for body measurement of livestock with similar forms of cows or pigs. Computers and Electronics in Agriculture, 138, 60-68. (Year: 2017).*

(Continued)

*Primary Examiner* — Gregory A Morse
*Assistant Examiner* — Rohan Tejas Mukundhan
(74) *Attorney, Agent, or Firm* — Oblon, McClelland, Maier & Neustadt, L.L.P.

(57)          ABSTRACT

A growth monitoring system, and method, for livestock animals includes a barn environment that has a floor with bedding material, a 3D camera with a downward looking field-of-view, in which an animal may be present during a visit, to obtain repeatedly a 3D image of the field-of-view, and an image processor to extract a 3D point cloud representation. The image processor detects whether an animal is present in the point cloud representation, and if yes, selects the animal part point cloud of the point cloud representation, and determines a position dependent first height information, being a height above the floor of the animal part point cloud, and determines a position of the front legs and/or the (Continued)

hind legs of the animal, and if no, determines a position dependent second height information, being a height above the floor of the bedding material.

16 Claims, 2 Drawing Sheets

(51) Int. Cl.
    *G06T 7/60*         (2017.01)
    *G06T 7/73*         (2017.01)

(56)                 References Cited

OTHER PUBLICATIONS

Zhao, K., Shelley, A. N., Lau, D. L., Dolecheck, K. A., & Bewley, J. M. (2020). Automatic body condition scoring system for dairy cows based on depth-image analysis. International Journal of Agricultural and Biological Engineering, 13(4), 45-54. (Year: 2020).*
International Search Report issued Oct. 12, 2022 in PCT/IB2022/056385, filed on Jul. 11, 2022, 3 pages.

* cited by examiner

MONITORING SYSTEM FOR INDIVIDUAL GROWTH MONITORING OF LIVESTOCK ANIMALS

CROSS REFERENCE TO RELATED APPLICATIONS

This application is a National Stage entry under 35 U.S.C. § 371 of PCT/IB2022/056385, filed on Jul. 11, 2022, and claims priority to NL Patent Application No. 2028749, filed on Jul. 16, 2021, the entire contents of which are incorporated herein by reference.

The present invention relates in a first aspect to a growth monitoring system for monitoring individual animals, and in a second aspect to a method for monitoring growth of individual animals.

Monitoring growth is helpful in assessing the health of animals, as well as generally in the management of the animals. For example, determining when a certain action should take place may depend on the size of the animal. Examples for calves are weaning, the first insemination, while for meat animals the time of slaughtering often depends on weight or size.

Monitoring growth requires being able to determine a dimension of the animal consistently. For most livestock animals, and certainly young animals, growth almost always takes place in three spatial dimensions (as well as weight). For this reason, the present invention concentrates on height as the dimension of choice for monitoring growth.

Although it is not uncommon for weighing systems to monitor growth, the accuracy and the usefulness of weight measurements are less than optimum. For example, the weight of the contents of the gastrointestinal tract and the bladder may vary significantly. Less common are methods to measure a dimension of the livestock animal. Almost always this requires manual labour in order to provide useful measurement results.

Document NL2011952A1 discloses a 3D camera system for monitoring growth of an animal, that is arranged to determine a number of volume related parameters, such as various height parameters, and preferably also a weight. The system is used in a location with fences to limit movement of the animal, and it is arranged to determine the height of the animal with respect to the floor or another horizontal surface, and may be used for example every day or every week.

In practice it was found that these measurements were not often sufficiently reliable, while at the same time measuring the animal in a confined environment led to stressful situations. Furthermore, in particular for young animals, stressful situations should be avoided as much as possible, so moving the (young) animal to the confined environment even more often is not a good option.

It is an object of the invention to tackle the abovementioned disadvantages.

It is a particular object of the present invention to provide a system for monitoring growth of livestock animal that provides more accurate measurements while leading to less stressful situations for the animal, and without leading to much manual labour.

The present invention achieves these objects at least partially by means of a growth monitoring system according to claim 1, in particular a growth monitoring system for monitoring growth of individual livestock animals having front legs and hind legs, such as cows, comprising a barn environment in which one or more such livestock animals can move about, and which has a floor with bedding material, a 3D camera with a field-of-view that comprises a part of the barn environment in which an individual one of the livestock animals may be present during a visit, and which 3D camera is arranged to obtain repeatedly a 3D image of said field-of-view, an image processor arranged to process the obtained image, to extract a 3D point cloud representation of the field-of-view from said processed obtained image, wherein the image processor is arranged to detect whether one of said livestock animals is present in said 3D point cloud representation, and if yes, to select the animal part point cloud of said point cloud representation, and to determine a position dependent first height information, being a height above the floor of said animal part point cloud of said point cloud representation, and to determine a position of the front legs and/or the hind legs of said individual livestock animal from said animal part point cloud, if no, to determine a position dependent second height information, being a height above the floor of said bedding material, wherein the image processor is arranged to determine a height of said individual livestock animal at said visit from said first height information, said second height information and said position of the front legs and/or of the hind legs. Herein, "position dependent height information" indicates that the measured height (or distance, in the rough, not yet processed measurement) is a function of position. In turn, the position may be taken to be the position in the image itself, or preferably in the real world, in particular on the animal. This will in each case be clear in the context.

The inventors have realised that it may be better, less stressful, but also more accurate if there is a system that is able to measure more often, but in a more natural environment for the animals. And the latter almost consistently has bedding material on the floor. Usually, such bedding material is quite soft, and it may be compacted when an animal stands on it. This leads to a change in time of the height and other properties of the bedding material, and thus to inaccuracies in the measured height of the animal. To counteract this, the system according to the invention corrects this by taking an image of an empty field-of-view, i.e. without the animal, measures the height of the bedding material and then determines the height of the animal, taking into account the bedding height material measured before and/or after the animal's visit. Thus, even if the bedding material's height changes in time, because new material is added, old material removed, or simply because the bedding material is gradually compacted by the animal's weight, this is always corrected for. Thus, measuring in a more natural environment reduces stress for the animal. Furthermore, being able to measure often reduces the chance of mismeasurements, or at least their impact such as by outliers. And in each case, there is no need for a one-time, fixed calibration measurement, because the image processor can always use an image of the empty field-of-view to find the correction value.

In the present invention, the downward looking field-of-view is not only the spatial angle of the 3D camera, but also the part of the space that is imaged by the camera. Moreover, 'downward looking' is intended to comprise having field-of-view that widens in a downward direction. A central line of the field-of-view determines generally that direction, and is thus also in a downward direction, and is preferably vertical, or at least within 20° from the vertical. Furthermore, a "visit" is intended to mean an instance of the livestock animal being within the field-of-view of the 3D camera, such that it can be detected by the image processor.

The 3D camera may be any type of camera that is able to provide 3D information, such as a stereovision camera or, preferably, a time-of-flight camera. The former may use ambient light that reflects off objects in the field-of-view, or emit itself radiation, such as a pattern to create an artificial texture for stereo matching. The latter also emits radiation itself, mostly infrared or visible radiation, and uses either a direct round-time measurement or, most often, phase modulated radiation and a phase-shift measurement in order to determine distance to the camera. Yet other 3D technologies are not excluded, however.

Furthermore, a 3D point cloud representation is a collection of per-pixel depth information. Thereto, the 3D camera measures for each pixel the distance to the nearest reflective object in the direction corresponding to the pixel. From all these pixel-distance pairs, the image processor can generate a surface, consisting of one or more objects that have reflected radiation towards the 3D camera. Note, however, that it is not necessary for the image processor to generate such a surface, since the calculations may be performed with the pixel-distance pairs. In case no distance could be determined for a pixel, for example because either no object was present in that direction, or it was too far away or too little reflective etc., then the image processor may use an "invalid" value or a default value, indicating "no object found" for that pixel. In practice, there will of course always be an object in the form of bedding material, or, in case all bedding material has been removed from a particular spot, the floor surface, but it may happen that it cannot be determined or measured, because it is too far away, or reflects too little radiation, and so on. Furthermore, although not necessary, the image processor may represent to a user the collected information, e.g. in the form of a representation on a screen or display of the one or more point clouds or surfaces as found by the camera. Those one or more surfaces together, including default values for pixels for which no distance information could be obtained, are called the (3D) surface representation.

The point cloud representation thus provides for each pixel, i.e. for each direction with respect to the centre of the field-of-view of the 3D camera, a distance information. This represents the field-of-view in more or less spherical coordinates, which the image processor may easily transform into cartesian coordinates. In turn, this provides height information of the point cloud representation, which thus also represents position-dependent information on height. This height represents height above the floor, if the floor level has been determined before in a reference measurement, either with the 3D camera itself, or any other measurement.

The image processor is furthermore arranged to detect whether one of the livestock animals is present in the point cloud representation, i.e. in the field-of-view or in the part of the barn environment as seen by the 3D camera. It can do this according to any known technique. A simple example is looking at dynamic differences between consecutive images, and if a sufficiently large, and preferably contiguous, portion of the image changes, or if the measured distance or height changes to above a predefined threshold, then the image processor may conclude that an animal is present. Other techniques, such as more elaborate image recognition, are of course also possible.

The image processor is moreover arranged to determine a position of the front legs and/or the hind legs of the animal. This relates e.g. quite generally to determining the front of the animal. Almost all livestock animals will have an elongate shape as seen from above, with the front legs on one side, obviously the front side, and the hind legs at the opposite side. Furthermore, it is advisable to measure height of the animal consistently at (about) the same position of the animal. Therefore, the position of the front and/or hind legs is determined by the image processor. This may be done based on characteristics of the animal's shape. Again in most cases, the front legs will be at the side where the head is, and the head is for example directly recognisable because of its intrinsic shape, or it is either higher or lower than the rest of the back. It is however noted that the position of the front legs and/or hind legs may be determined in a different way, and also more accurately. This will be elucidated further below.

After the image processor has determined the position of the front and/or hind legs, it determines the height of the livestock animal according to any known criterion. The criterion as such may e.g. be the highest point on the point cloud representation of the animal, or the highest point on the spine portion of the animal, as determined along a central line of the animal's point cloud representation and excluding a head/neck portion, or the height of a characteristic point, such as a specific bone, e.g. a hip bone, or the tail base, and so on.

The image processor then corrects the height of the corresponding point on the point cloud representation by subtracting the height of the point cloud representation of the bedding material, in order to obtain the true height of the livestock animal. The point cloud representation of the bedding material is obtainable by the image processor by looking at a 3D image in which no livestock animal is detected, in particular not even partially. This may e.g. be obtained by looking at an image in which substantially all (relevant) pixels are at a height below a predetermined threshold height, i.e. further away than a predetermined distance threshold. Herein, the position-dependent height information about the bedding material may be as simple as an averaged value to be subtracted from the position-dependent height information of the point cloud representation of the livestock animal. In other words, the measured height of the bedding material may be averaged over the field-of-view, to obtain one value. This value, that smoothes out the intrinsic roughness of bedding materials, such as straws sticking out, and already provides an estimate, albeit still rather rough, of the height correction to obtain a correct, true height of the animal. More accurate methods will be elucidated upon further below.

It will be clear that the image processor thus processes at least two 3D images in order to obtain the true height of the animal, at least one with the animal's point cloud representation, and at least one with the bedding material's point cloud representation at the same position. In both cases, but in particular in the case of the bedding material's point cloud representation, having one than one image enables to determine a better representation, since not all pixels allow the determination of a correct distance information. Note that bedding material is often relatively far away from the 3D camera, and thus often provides only a faint image, and often relatively difficult to image and match correctly in order to determine distance per pixel. Thus, a single obtained image often contains relatively many pixels with an invalid value. When multiple images are combined, information may be combined, such as averaged, and there will be fewer pixels to be ignored, and a more complete and accurate point cloud representation may be obtained.

Preferably, the system is arranged to obtain the latter image(s) not too much later or earlier than when the former image was obtained. This may for example be achieved by having the system obtain a 3D image of the field-of-view without an animal when the image processor detects that the detected animal is no longer present in the 3D image.

Thereto, the system is arranged to obtain and process a 3D camera repeatedly until at least one 3D image without a detected livestock animal has been obtained. Likewise it is possible to have the system obtain and process a 3D image repeatedly, such as continuously, and to use the last obtained 3D image without a detected livestock animal as the image for use in determining the height information of the bedding material. This will be elucidated further below.

Specific embodiments are described in dependent claims, as well as in the following part of the introduction.

In the above, most general embodiment of the invention, there is no specific limitation on where the height of the livestock animal is determined. This depends on the selected height criterion, such as hip height, and so on. To support a more specific height determination, in embodiments, the image processor is arranged to determine said position dependent second height information by subdividing the field-of-view in a predetermined number of subfields, determining a height information per subfield, and to determine said height of said livestock animal based on said second height information at the subfield at the position of the front legs and/or hind legs, respectively. By dividing the 3D image, of field-of-view, in this way, it is possible to apply a more accurate correction and thus determination of the livestock animal's height. For example, the image processor subdivides the field-of-view in a row of a number of segments, wherein the number is between 2 and at most the number of pixels. In practice, a number between 5 and 50, such as approximately 10, will suffice in many cases.

The image processor will then determine a height value of the bedding material for the segments, or alternatively at least for the segment or segments in which the position of the front legs and/or of the hind legs is present. Depending on the way in which the image processor is arranged to determine the true height of the livestock animal, the height value or values may then be used to correct the determined first height information, in order to come to that true height of the livestock animal.

In order to determine the position of the front legs and/or of the hind legs, the image processor may use any known technique, such as object recognition of extremities or the like, or use animal-dependent information of those positions with respect to a front end and/or a back end of the animal. For example, in case the livestock animal takes up 10 segments in the 3D image, the position of the hind legs will be most likely in the segment at the back end of the animal, while the position of the front legs will in most cases be around the third segment from the front of the animal. Still other techniques may be used by the image processor. It may e.g. be arranged to determine the position from protruding bones, such as from the hip or the shoulders. Furthermore, if the number or segments is different, the legs' positions as a function of segment number will change accordingly.

By thus limiting the part of the image of which bedding height information is obtained, the correction of the height can be made much more accurate. Note that it is also possible to have the image processor arranged to subdivide the field-of-view lengthwise in a number of subfields, such as between 2 and 10. After all, the bedding material need not be as high on the left side of the livestock animal as it is on the right side. By this subdivision, this difference may be taken into account.

An even more accurate correction is provided if the image processor is arranged to subdivide the field-of-view into a mesh or matrix of subfields, thus in a first row by a second row of rectangular subfields. This allows for example to determine the bedding height for each of the four legs of the animal.

In particular embodiments, the image processor is arranged to subtract said second height information at the position of the hind legs and/or of the front legs from the first height information at the position of the hind legs and/or the front legs, respectively, to thereby obtain a corrected hind leg height and/or front leg height. Note that "front leg height" and "hind leg height", respectively, are intended to mean "animal height at the front legs", "animal height at the hind legs", respectively. The animal height may then e.g. be determined as the height at the hind legs, or the height at the front legs, or the average of both height values. This is an example of a way to define a useful height of the animal, such that it can be determined reliably, and monitored easily.

In embodiments, the image processor is arranged to determine an interpolated height, preferably a linearly interpolated height, of the second information between the position of the front legs and the position of the hind legs, and to subtract the interpolated height from the animal part point cloud in order to form a corrected animal height information, and to determine said height of the livestock animal from the corrected animal height information. Herein, use is made of the insight that a different bedding material height may cause a different correction value for the front legs and the hind legs, or even for all four legs, in the case of a mesh or matrix of segments. In such a case, all of the animal's point cloud representation in principle needs a different correction, because of the possible tilt of the animal with respect to the horizontal. In a first approximation, this correction is a linear interpolation between the determined height corrections for the front legs and/or for the hind legs. For example, if the left front leg is on 12 cm of bedding material, the right front leg on 14 cm, the left hind leg on 10 cm, and the right hind leg on 12 cm, the geometrical centre of the animal's legs is effectively on $(12+10+14+12)/4=12$ cm bedding material. For each part of the animal's point cloud representation, a corresponding correction of the determined height can be calculated. It is important to note that this interpolation is based on bedding material measurements at the position of the legs, and not at any other position. For example, in this embodiment the animal's point cloud representation should not be corrected by subtracting the bedding material height at the corresponding position, or by some averaged bedding material height. After all, the bedding material height between the legs is irrelevant, as that does not influence the animal's height or posture.

In embodiments, the 3D camera is arranged to obtain 3D images repeatedly, preferably at each visit of said livestock animal, and the image processor is arranged to determine said second height information from a 3D image obtained immediately after said visit and/or from a 3D image obtained between said visit and a latest previous visit of said livestock animal, preferably of any of said livestock animals. Capturing 3D images repeatedly allows the image processor to determine the first and second height information, and thus also the true height of the livestock animal Thereto, the image processor and 3D camera are preferably arranged accordingly. It allows to smooth measurements, and discard outliers, e.g. due to a measurement error or other cause. It suffices in some circumstances to have the image processor arranged to take at least one 3D image of the livestock animal at each visit for the purpose of obtaining first height information, as well as at least one 3D image of an empty field-of-view, preferably immediately after a visit, i.e. without any intermediate visit of another animal. This ensures that the bedding material is still as much as possible as it was when the animal of the 3D image left the field-of-view. Alternatively or additionally, the system is arranged to obtain images of the bedding material repeatedly, and to select an image immediately before said visit, thus without an intermediate visit of another animal. Again, this ensures that the bedding material is as much as possible like it was when the animal entered the field-of-view. Even more advantageously, the system is arranged to base the second height information on an average of a 3D image immediately before and one immediately after saif visit. This will better account for any influence the livestock animal itself might have on the bedding material, in particular because of its own weight.

The way in which the image processor determines the position of the front legs and/or the hind legs, or at least of the front or back of the animal, is not particularly limited. For example, the mage processor may be arranged to determine the position of a specific body part, such as a hip bone projection, which determines the position of the hind legs. In embodiments, the image processor is arranged to determine a body contour of said live stock animal from said animal part point cloud, and to determine said position of the hind legs and/or of the front legs from said body contour. The body contour may e.g. be determined by the image processor as the "curve", or narrow part of the point cloud, where the height value in the first height information drops off with at least a predetermined steepness, but also as the point cloud or surface that is delimited by that curve, i.e. as a region. The image processor is then arranged to determine said position (s) with the help of object recognition and other imaging techniques known per se, such as determining where the narrowest part (neck part) is, or where there is a specific shape, such as that of the back end of the animal. Possibly, additional info stored in the image processor may be useful, such as historical or literature data. An important advantage of the use of a body contour is that it is easy to determine, and in fact may be based on a 2D assessment, which requires less computing power. Furthermore, the body contour is a useful property in further assessing the measurement. Therefore, if the image processor is arranged to determine the body contour, it may use same for further purposes, although it may of course also be arranged to use other information from in particular the point cloud representation or animal part point cloud.

For example, in embodiments, the image processor is arranged to assess an animal posture of said livestock animal from said animal part point cloud, and to discard the animal part point cloud in case the animal part point cloud does not fulfil a posture usefulness criterion. It has been found that the livestock animal not always assumes a posture in which the animal part point cloud or first height information allows a reliable true height determination. For example, in order to have reliable results, it is desirable to always use a similar posture, such as in particular drinking. In this position, the animal's head is lower than the rest of the body. Note that the height of the head if standing upright, i.e. not drinking, may vary considerably, which is however very relevant if the height of the animal were defined as the height of the highest point. After all, the head is then that highest point, while it suffers from a high variability. Such a definition would lead to unreliable height measurements. Thus, not only is it desirable to have a useful definition of the height of a livestock animal, it is also useful if it is possible to determine whether the livestock animal's posture fits that definition, and to discard the animal part point cloud, i.e. the measurement, if it does not.

Thus, in exemplary embodiments, said posture usefulness criterion comprises that a highest part of said animal part point cloud is positioned in a posterior part, such as a backhalf, of the livestock animal. It turns out that if an animal is e.g. drinking, such as would be done at a drinking station, which is an important feature when raising calves or other young livestock animals, the highest part of the animal is then most often found at the posterior part, in particular the backhalf of the animal. In any case, if the highest point, or preferably the highest region, is in the back half, the true height can often be determined more reliably by the image processor. The height may then be taken at the position of e.g. the hip bone protrusion, or as the value of the 95th percentile, or some other predetermined percentile, of the pixel-wise height values of the corrected height information (i.e. second height information corrected by the first height information). Similarly, the "position of the highest point" may e.g. be taken as the position of the smallest segment, or even pixel, with the highest absolute height (again the corrected value of course), or a somewhat averaged position may be determined, such as the centroid, i.e. the geometrically averaged position, of a predetermined percentage of all segments/pixels with the highest absolute height making up the animal part point cloud. This "highest point" should in each case be positioned in the back half of the animal in order for the livestock animal to be in this particular desired posture. Note, however, that a different posture, with consequently a different criterion for posture usefulness, is still possible.

In particular, said posture usefulness criterion may comprise that a degree of symmetry of said animal part point cloud with respect to a major axis thereof is at least as high as a symmetry threshold value. The degree of symmetry of the livestock animal's animal part point cloud is an indication of how straight the animal is standing. One can imagine that if the animal leans to one side, or bends to the left or right, or the like, the symmetry of the animal part point cloud is reduced. The degree of symmetry may be defined according to any desired criterion, as long as an animal part point cloud that is more symmetrical with respect to its major axis (=longitudinal axis, or the spine in a healthy animal) leads to a higher value. Furthermore, one may also use the degree of asymmetry (DoA), that may similarly be defined, or simply as DoA=1–DoS. For example, if one draws a line between the beginning and the end of the spine, such as from the tail part to the neck part, and one calculates twice the absolute average of (perpendicular width to the left minus perpendicular width to the right) divided by the total perpendicular width, one ends up with a number between zero, which is a perfectly straight and symmetrical animal, and one, which is a totally symmetrical animal. It turns out that the latter animals, or rather those with a higher degree of symmetry, lead to a more reliable height measurement.

Upto this point, a plurality of animals has not been discerned, and the embodiments were mostly useful for individually kept animals, in which situation the system need not identify the livestock animal. However, often livestock animals are kept in groups, and for this situation to allow a useful height determination and monitoring, some kind of ID is used. To allow the system to identify the individual animals, in embodiments, the system further comprises an animal identification device, arranged to determine an identity of the individual livestock animal at said visit. Herein, the animal identification device may comprise an ordinary tag reader that reads the animal's ID tag, such as one worn around the neck. It may also be a software module that identifies the animal optically, such as from a pattern on the skin, and so on, as long as the ID can be determined uniquely.

In another aspect of the present invention, the invention relates to a method of monitoring growth of individual livestock animals having front legs and hind legs, such as cows, in a barn environment in which one or more such livestock animals can move about, and which has a floor with bedding material, the method comprising obtaining repeatedly, by means of a 3D camera with a field-of-view that comprises a part of the barn environment in which an individual one of the livestock animals may be present during a visit, a 3D image of said field-of-view, processing the obtained image by means of an image processor, wherein the processing comprises extracting a 3D point cloud representation of the field-of-view, detecting whether one of said livestock animals is present in said point cloud representation, if yes, then selecting the animal part point cloud of said point cloud representation, determining a position dependent first height information, being a height above the floor of said animal part point cloud, and determining a position of the front legs and/or the hind legs of said individual livestock animal from said animal part point cloud, and if no, then determining a position dependent second height information, being a height above the floor of said bedding material, determining a height of said individual livestock animal at said visit from said first height information, said second height information, and said position of the front legs and/or of the hind legs.

This relates to more or less the method counterpart of the system claim of the present invention. The advantages and functioning therefore largely come down to those of the system claims. The special features of the system claims and their advantages will hold for the method claim as well, and are neither repeated here for brevity.

The present invention thus provides a system and a method that enable to determine repeatedly height information of animals, such as calves. The method and system are furthermore simple, do not require manual labour, and allow the determination to take place in as natural an environment as possible for the livestock animal. In particular, it takes place in a stable with bedding material, and not in a dedicated box with an even but barren and hard floor. Furthermore, repeatedly determining the height of an animal allows to monitor the development, health etc. of the animal more closely than when the height is measured manually every now and then, say every two weeks. Thus, the "monitoring" of the present invention is the repeated measuring and determining of the height information. Whatever is done with the obtained information is in fact not really a part of the present invention. Suffice it here that the invention provides more possibilities to enable a useful monitoring of the animal's growth.

The invention will now be explained further with reference to a number of non-limiting embodiments and the drawing, in which:

FIG. 3b shows the average height per segment of FIG. 3a;

FIG. 4b shows a graph of the (first) height information h1 for the 3D calf image of FIG. 4a;

Figure 5:
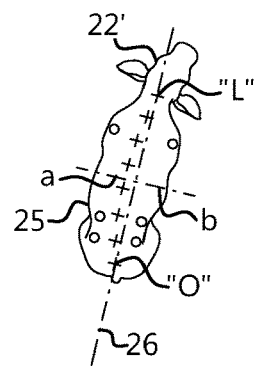

FIG. 5 diagrammatically shows an animal part point cloud of a calf; and

Figure 6:
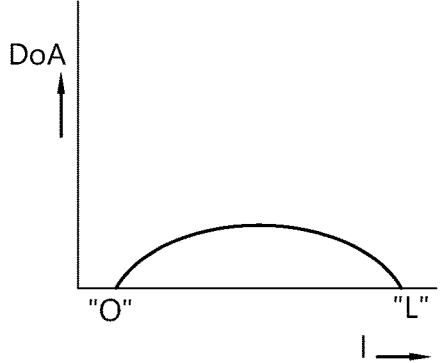

FIG. 6 shows a graph of the degree of symmetry for the calf shown in FIG. 5.

Figure 1:
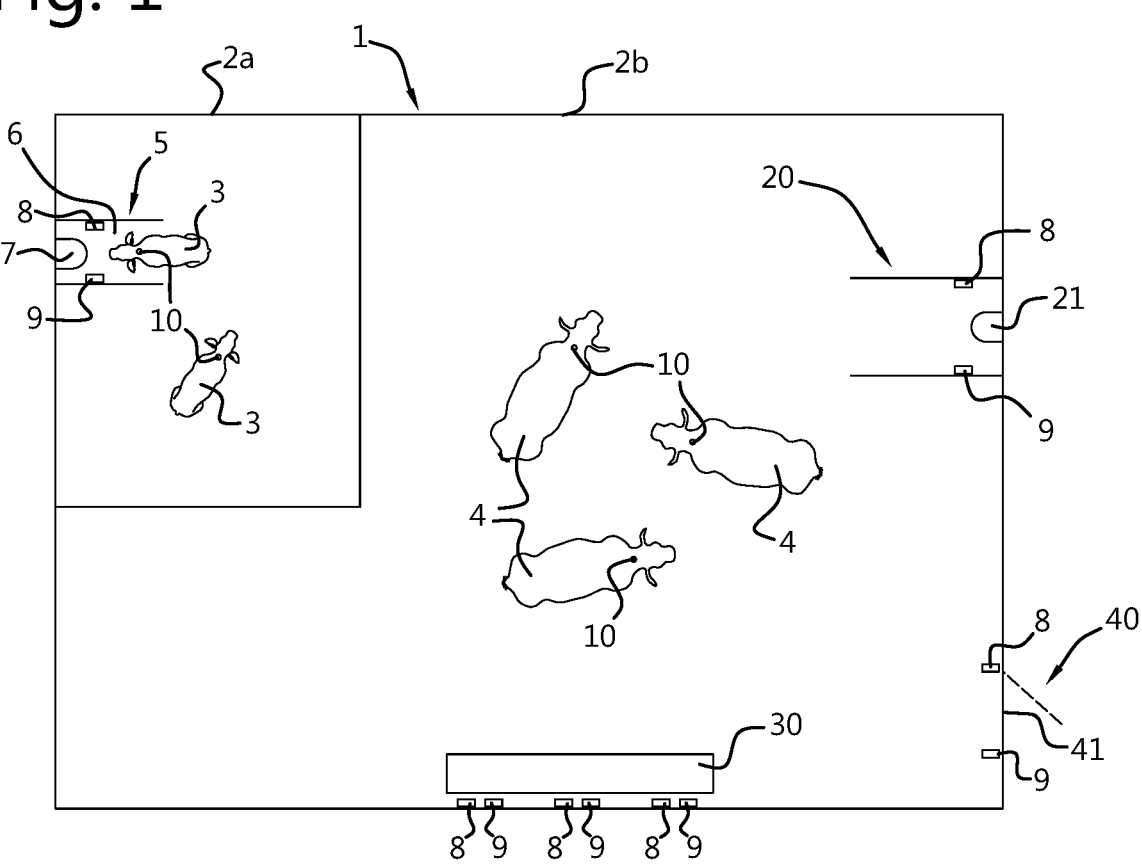
FIG. 1 shows a diagrammatic top view of an embodiment of the growth monitoring system 1 according to the present invention.

FIG. 1 shows a diagrammatic top view of an embodiment of the growth monitoring system 1 according to the present invention. The system 1 comprises a calf barn environment 2a for housing calves 3, and a cow barn environment 2b for housing cows 4.

In the calf stable environment 2a, there is provided a calf drinking station 5, with a box 6, a drinking implement 7, a 3D camera 8 and an animal ID tag reader 9 for reading ID tags 10 on the calves or cows. In the cow barn environment 2b, there are provided a concentrates feeding station 20, a drinking trough 30, and a gate device 40, in each case again provided with at least one 3D camera 8 and at least one animal ID tag reader 9. The feeding station 20 further comprises a feeding trough 21, and the gate device 40 comprises an openable gate 41.

In the calf barn environment 2a, a number of calves 3 are held separate from the cows, in order to provide them with optimised feed and care. Thereto, a.o. a calf drinking station 5 is provided, in which each the calf 3 may obtain, via a drinking implement 7 such as an artificial teat or a trough, an amount of milk adjusted to its stage of development. It is furthermore possible to provide other feeding stations, e.g. a station where a calf can get an amount of solid feed/roughage that slowly increases during its development. In the Figure, this has not been shown any further.

When a calf 3 drinks at the calf drinking station 5, she enters the box 6 and is identified by means of its ID tag 10, which is read by the animal ID tag reader 9. A control unit, not separately shown here, determines the animal ID from the read ID tag information, and determines how much milk is to be supplied to the calf in the drinking implement 7.

When the calf 3 is positioned at the drinking implement 7, and is identified, the 3D camera 8 obtains one or more 3D images of the box 6 with the calf 3 therein. The 3D camera 8 also obtains one or more 3D images of the empty box 6, e.g. after the calf 3 has left the box 6, or the last one of the empty box before entry of the calf 3. The control unit can determine when no calf is detected in the obtained 3D image e.g. from determining whether a sufficient number of pixels in the field-of-view of the 3D camera 8 is above a height threshold. The 3D camera 8 may e.g. be a time-of-flight camera, a stereovision camera, or any other type of camera that is able to obtain a 3D image of its environment. The processing of the 3D images, and further details of the set-up of the system according to the invention will be discussed further in relation to FIGS. 2-6

The other stations shown in FIG. 1 work in much the same way. In the cow barn environment 2b, a number of cows 4 can walk about, and can for example obtain concentrates at the feeding trough 21 in the concentrates feeding station 20. When the cow 4 enters the station 20, she is identified through her ID tag 10 by means of animal ID tag reader 8. Again, one or more 3D images are obtained by means of the 3D camera 9 during feeding, as well as after feeding, with an empty feeding station 20. Similarly, a number of 3D images may be obtained at the drinking trough 30, where there are multiple 3D cameras 9 and multiple animal ID tag readers 8, because of the larger dimensions of the drinking trough 30. And likewise, a cow 4 may present herself at the gate device 40, with the openable gate 41. Again, she will be identified through her tag 10 by means of the tag reader 8.

If allowed, she will gain access to e.g. a paddock or meadow when the control unit opens the gate 41. During the cow's waiting at the gate device 4, the 3D camera 8 will obtain one or more 3D images. When the cow 4 has passed the gate device 40, the 3D camera 8 will take one or more additional 3D images.

It is noted that it is not necessary to have both a calf barn environment 2a and a cow barn environment 2b, as the invention applies as well to one such environment, or more than two. Furthermore, the relevant animals need not be calves and cows, but may also be just calves, just cows, just heifers, any combination thereof, any corresponding age group of any other livestock animal such as sheep or horses, and/or any combination thereof.

Moreover, it is noted that it is neither necessary to have a multitude of stations with a 3D camera 8 and animal ID tag reader 9. A single station where the, or each, animal presents itself suffices for monitoring according to the invention. In addition, it is noted that there may be provided one or more milking stations in the cow barn environment 2b, at which milking stations the cows may be milked. However, lactating cows will be at least around 2 years old, and growth monitoring is less relevant, although still possible according to the invention.

Figure 2:
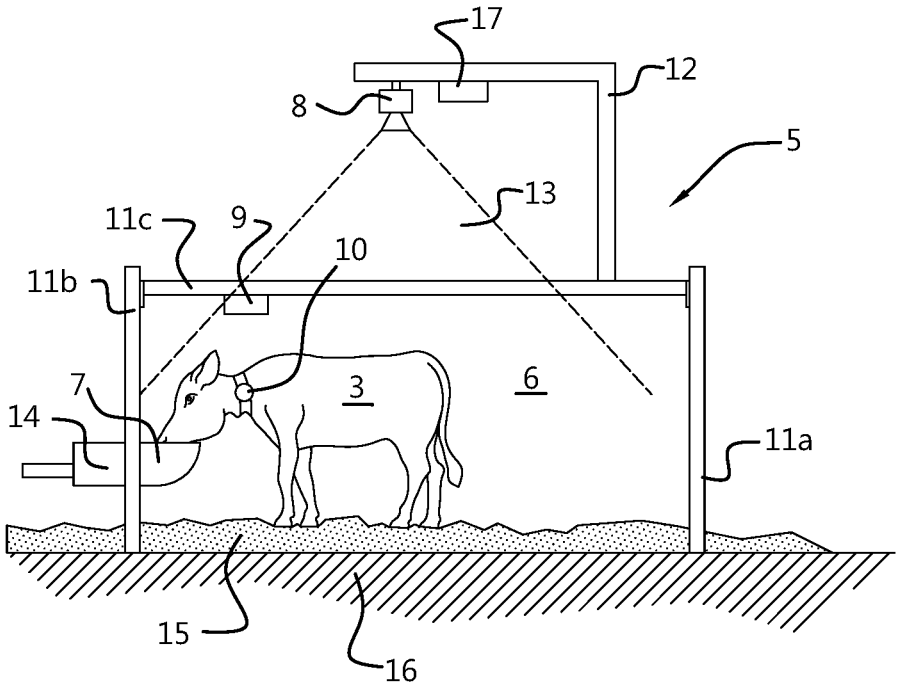
FIG. 2 shows the calf drinking station 5 of FIG. 1 in a diagrammatic side view.

FIG. 2 through 6 will now be used to explain how the invention works. FIG. 2 shows the calf drinking station 5 of FIG. 1 in a diagrammatic side view. In all of the drawing, similar parts are identified by the same reference numerals, if need be with one or more primes ('). The station 5 has a box 6 with a first and second upright post 11a, 11b, and a horizontal beam 11c that carries the animal ID tag reader 9. An upright pole 12 carries the 3D camera 8, that has a field-of-view 13, limited by the dashed lines, and has a built-in control unit 17 with image processing capabilities. The drinking implement 7 is fillable by the filling system 14. There is provided a layer of bedding material 15 on the floor 16.

When the calf 3 enters the box 6 of the drinking station 5, she is identified by the animal ID tag reader 9, as described above. Furthermore, the 3D camera 8 obtains one or more images of the calf 3 in the box 6, that is present within field-of-view 13 of the 3D camera. The calf drinks her milk allowance at the drinking implement 7, as supplied by the filling system 14, and based on her identity and past amounts she drank. After the calf 3 has left the box 6, the 3D camera again obtains one or more images of the box 6.

It is also possible for the 3D camera to obtain one or more images of the box 6 before the calf 3 enters same. This allows to obtain an average image of the empty box 3. To do this, it is possible for the 3D camera 8 to obtain images repeatedly, and only use the one or more pictures (immediately) before the calf 3 enters the box 6. In order to prevent a too large memory usage, it is possible to overwrite the oldest images, if no calf enters the box 6 for at least a predetermined time. And whether or not a calf enters the box 6 may be determined by the control unit 17 from the images by means of standard image processing techniques, such as differential images and object recognition.

The control unit 17 is now able to determine a height of the calf 3 from the obtained images. This will be elucidated with reference to FIGS. 3a,b and 4a,b.

Figure 3A:
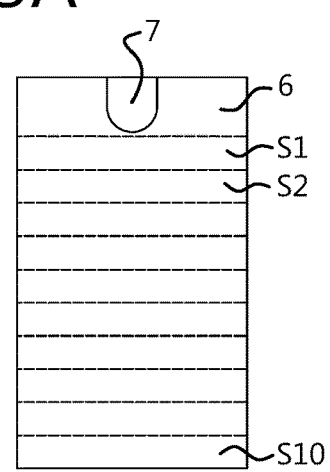
FIG. 3a shows a diagrammatic 3D image of an empty box 6.

FIG. 3a shows a diagrammatic 3D image of an empty box 6. The image is 2D collection of pixels, with e.g. distance information for each pixel. This depth information could be indicated in the image by means of false colours, an intensity, and so on. This is not visible in FIG. 3a. For an empty box 6, the distance between 3D camera and bedding material, and from that the depth information, is an indication of the thickness of the layer of bedding material 15, such as straw, and thus of the basic height for the calf to stand on. The basic height may be the height as measured after the visit of the calf 3, as the height before visit of the calf 3, or as the average of before and after.

Figure 3B:
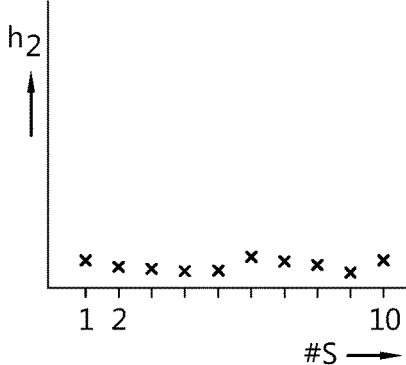

The image is divided into a number of segments, here 10 segments $S_1, \ldots S_{10}$. However, any other plurality of segments is possible, wherein a higher number of segments offers the opportunity to provide a more finely divided height information, even down to pixel level of the camera used. It is also possible to use interpolation based on a limited number of segments. It is noted that it is not always easy to obtain relevant (second) height information from bedding material 15 such as straw. After all, there may be individual straws sticking out upwards, and so on. Therefore, according to embodiments, for each segment there is obtained, by the control unit 17, a height above the floor 16, such as an average or median height, or some other statistically meaningful height information. This height information, e.g. determined by averaging the height of the pixels in the segment, is depicted in FIG. 3b, that shows a diagram with the average of the determined second height information h2 per segment, as deduced from FIG. 3a. The average height of a segment as thus determined is taken as the basic height, i.e. of the bedding material, to be used in determining the actual height of the calf 3.

Figure 4A:
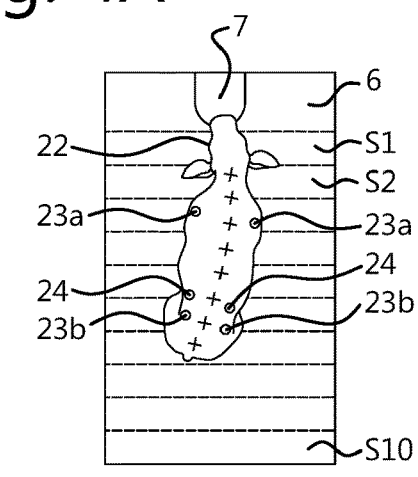
FIG. 4a shows a diagrammatic 3D image of a calf 3 in the box 6.

FIG. 4a shows a diagrammatic 3D image of a calf 3 in the box 6. The calf 3 has a head 22, front legs 23a, and hind legs 23b, as well as hip bones 24. An estimated position of the spine is indicated with the '+' signs. Also indicated are the same 10 segments as were present in FIG. 3a.

In the 3D image, which is a 3D point cloud representation, the control unit 17 may recognise a calf 3 by means of object recognition techniques, e.g. after training by a person and AI or deep learning techniques. It may simply start by looking at the difference between an image of the box with the calf, and a reference 3D image of an empty box. If a sufficient contiguous area has a sufficient height above the floor 16, or rather above the bedding material 15, and has a shape that resembles a calf, such as a recognisable head portion and a length-width ration within a certain range, then the control unit may decide that a calf 3 is present in the 3D image. The calf is then represented by a calf part point cloud, as the pixels determined to belong to the calf. The other pixels in the image of the field-of-view may, and preferably have been, discarded.

Figure 4B:
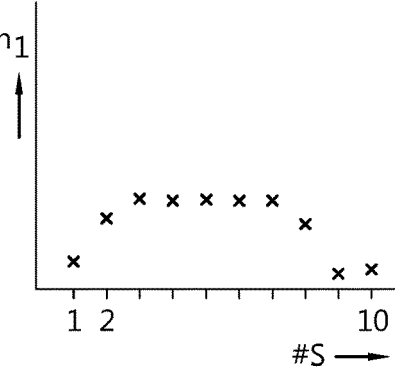

For the 3D calf image, the (first) height information h1 is determined and put in the graph of FIG. 4b. This may be a (semi-)continuous height, or an average height per segment. The height of the calf at a position may e.g. be determined as follows, although other methods are not excluded. First, based on symmetry considerations, the position of the spine is determined as the centre line of the outer circumference of the body of the calf 3, i.e. of the total circumference excluding the head portion 22. This is arbitrarily indicated by means of the '+' signs in FIG. 4a. Then the height (still above the floor, not the intrinsic height) of a portion is determined by making a vertical slice through the surface perpendicular to the direction of the spine, and determining the highest point in that slice. Alternatively, a shape approximation may be used, such as a local parabola or the like, from which the highest point may then be determined mathematically. This is done for all of the spine, or at least for all segments in which the calf's image is present. Note e.g. that in the example shown in FIG. 4a, the calf is not present in the last 3 segments, so that no relevant height information can be given for those segments.

The determined height information is then compared to the basic height as determined from the empty box 6, as described for FIG. 3*a,b*. The height of the calf may then, in a basic embodiment, be determined by subtracting the basic height information from the height information as determined for the calf in the FIG. 4*a,b*, and determining the maximum thereof. In this way, the ever changing height of the bedding material 15 can no longer affect a correct height measurement of the calves. Note that any height of a head portion 22 will not be included, since the head may be raised or lowered without this indicating or affecting the true height of the calf.

In a more elaborate system, the control unit determines in a step the position of the hind legs 23*b*. It can do this in a number of ways. For example, it can determine the position of the rear end of the calf, as the position where the height value drops off sharply or drops below a threshold value. Then the control unit determines the position of the hind legs as a certain distance in front of the position of the rear end, in the direction of the spine. Alternatively, the control unit determines the position of the hind legs on the basis of the position of the rear end and a first calf-dependent displacement value. This displacement value is stored in the control unit, and is looked up on the basis of the established calf identity. Yet alternatively, the control unit determines the position of the hip bones 24, as the two highest points of the calf near the rear end thereof, and then determines the position of the hind legs as said position or as said position as corrected with a predetermined or a second calf-dependent displacement value, again as stored in the control unit and looked up on the basis of the established calf identity.

After determining the position of the hind legs 23*b*, the control unit determines the segment in which the hind legs' position is, and then determines the basic height of that segment. The control unit then determines the height of the calf as the true height at the segment of the position of the hind legs 23*b*, i.e. the determined height at the position of the hind legs minus the basic height of the same segment. Note that this dimension need not be the actual height of the calf as being the highest point, as the height at the shoulder (front legs) or at some other part of the spine may be higher. However, it is a very reproducible height and is very useful for monitoring the development of the calf.

It will be clear that it is also possible to determine the height of the calf as the height at the shoulders, i.e. at the position of the front legs 23*a*. It is determined in a fashion similar to that for the height at the hind legs 23*b*. First, the position of those front legs 23*a* is determined, e.g. from the position of the neck of the calf. The neck position is determined as the position of the narrowest width of the top view of the calf. It is also possible to use the rear end position, or the position of any other fixed part of the calf, such as the hip bones 24 as mentioned earlier. In any case, the control unit applies a predetermined or calf-dependent third displacement value to the determined position (of the neck, the rear end, the hip bones, etc.) to determine the position of the front legs. The front leg position is in one of the segments $S_1, \ldots S_{10}$. The basic height of that segment is determined from the height as measured with an empty box. The true height of the calf is then determined as the height as determined with the calf in the box, at the position of that segment, from which is subtracted the basic height of the bedding material at that segment.

In an even more elaborate embodiment, the height is determined for both the hind legs and front legs. Herein, the calf height may be determined as the average of both height values. Alternatively, the true calf height is determined as either the height at the hind legs or at the front legs, but in each case corrected on the basis of the height at the other legs, i.e. at the front legs, or at the hind legs, respectively. This allows to correct for a slanting posture of the spine, which could influence the measurement of the true height.

Additionally or alternatively, the height is determined as the highest point on all of the calf. Still, the basic height or heights to be used for correction is/are the one(s) for the segment of the front legs 23*a* and/or the segment of the hind legs 23*b*, since the bedding material does not influence the height of the parts of the calf in between the legs.

As an alternative to the above, it is also possible to segment the image, such as the image of the box, in a perpendicular direction, in particular lengthwise. However, the heights as thus measure may suffer from a somewhat larger inaccuracy, since the height of the bedding material, which height serves to correct to measured calf height in order to come to the true calf height, may vary more in the lengthwise direction than in the perpendicular transverse direction In a further development, the image of the box is segmented in two dimensions. This allows to measure the height even more precisely. The segmentation may be relatively course, such as into two segments, or finer, such as in a higher number of segments, such as between 3 and 10, or even finest, i.e. down to pixel level of the 3D camera used. In all cases it is again preferable if the basic height information, of the bedding material or more generally the height of the box or space where the calf will be standing during measurement, is measured in the absence of the calf, either after and/or before a visit of the calf. Furthermore, preferably the position of each of the legs is determined for the calf. The basic height information is then determined for the segments where the respective legs are. The control unit then corrects the measured calf height by subtracting the respective basic height information for the respective legs, and interpolates the height correction for the relevant parts of the calf, such as the parts between the legs. The height information of the calf thus obtained serves to determine the true height. Just as before, this may involve determining the height at the hind legs, at the shoulder, at the highest portion of the calf, and so on, as desired.

FIG. 5 diagrammatically shows an animal part point cloud of a calf with a head portion 22', and a main body 25. Again, the spine is indicated by plus signs, and a straight line 26 is drawn from the beginning of the spine at the back end, indicated "0", and the end near the head portion 22', indicated by "L". The left width of the animal part point cloud with respect to the drawn line 2 is indicated by "a", and the width to the right by "b". FIG. 6 diagrammatically shows the degree of asymmetry DoA for the animal of FIG. 5, as a function of position over the length of the line 26 between "0" and "L".

FIG. 5 is illustrative of an aspect of the invention, in which an image, after processing into an animal part point cloud by the image processor, is not always used. For example, if the head portion 22' is higher than the main body 25, or the highest point thereof, then it is assumed that the animal is not drinking, or keeping its head low for any other reason. In case the posture usefulness criterion comprises that the head should be kept low, then this image would be discarded. It is of course possible to use different criteria, such as to have the head portion 22' at least 10% higher than the highest point of the main body 25, or the like. Alternatively or additionally, the posture usefulness criterion may comprise a degree of asymmetry (DoA). As elucidated in the introductory part, this DoA may be defined in many different ways, but a definition found to be useful is the difference in width to the left and right with respect to the straight line along the main body 25. In order to express this in a numerical value, the formula DoA=2*|a−b|/(a+b) is used here, and shown in the graph of FIG. 6. Thus, for a perfectly symmetrical main body 25, the straight line 26 coincides with the spine (the "+" signs in the Figure), and the width to the left "a" is equal to the width to the right "b" at all points along the line. Then, the DoA is zero everywhere, and thus the average DoA is also zero, which is the perfect score. The less symmetrical the animal's body posture (animal part point cloud), the higher the score. The posture usefulness criterion could then comprise e.g. that the average DoA should be lower than a predefined threshold, such as 0.05 or 0.1. If the DoA is higher, the image is discarded. It is noted that the extreme cases of non-symmetrical animal part point clouds may occur for example if the animal licks its back and so on.

The use of the posture usefulness criterion enables the image processor to select only images that are mutually quite comparable. Thus, the true animal height as calculated with the help of such selected images becomes more reliable. And just because the system of the invention is able to repeatedly obtain 3D images of an animal, and select them if necessary, it can do away with complex methods to correct any image for the posture of the animal in order to calculate the true height.

In general, the system according to the present invention is able to reliably determine a.o. the height of animals in their ordinary surroundings, i.e. the stable with bedding material. It does this without further human intervention, and repeatedly. With the help of the repeatedly determined information on a.o. height, further actions and management in general may be taken. However, what those further management actions are is in principle not the subject of the present invention. It is however noted that being able to monitor the height etc. of animals almost continuously makes it possible to manage the animals almost in realtime, thus preventing any disadvantageous situations as much as possible.

The invention claimed is:

1. A growth monitoring system for monitoring growth of individual livestock animals having front legs and hind legs comprising:
 a barn environment in which one or more of the livestock animals can move about, and which has a floor with bedding material;
 a 3D camera with a downward looking field-of-view that comprises a part of the barn environment in which an individual one of the livestock animals may be present during a visit, and which 3D camera is arranged to obtain repeatedly a 3D image of said field-of-view;
 an image processor arranged to process the obtained image, to extract a 3D point cloud representation of the field-of-view from said processed obtained image;
 wherein the image processor is arranged to detect whether one of said livestock animals is present in said 3D point cloud representation, and
  if yes, to select an animal part point cloud of said point cloud representation, and to determine a position dependent first height information, being a height above the floor of said animal part point cloud of said point cloud representation, and to determine a position of front legs and/or hind legs of said individual livestock animal from said animal part point cloud, if no, to determine a position dependent second height information, being a height above the floor of said bedding material,
 wherein the image processor is arranged to determine a height of said individual livestock animal at said visit from said first height information, said second height information and said position of the front legs and/or of the hind legs.

2. The system of claim 1, wherein the image processor is arranged to determine said position dependent second height information by subdividing the field-of-view in a predetermined number of subfields, determining a height information per subfield, and to determine said height of said livestock animal based on said second height information at the subfield at the position of the front legs and/or hind legs, respectively.

3. The system of claim 1, wherein the image processor is arranged to subtract said second height information at the position of the hind legs and/or of the front legs from the first height information at the position of the hind legs and/or the front legs, respectively, to thereby obtain a corrected hind leg height and/or front leg height.

4. The system of claim 1, wherein the image processor is arranged to determine an interpolated height of a second information between the position of the front legs and the position of the hind legs, and to subtract the interpolated height from the animal part point cloud in order to form a corrected animal height information, and to determine said height of the livestock animal from the corrected animal height information.

5. The system of claim 1, wherein the 3D camera is arranged to obtain 3D images repeatedly and wherein the image processor is arranged to determine said second height information from a 3D image obtained immediately after said visit and/or from a 3D image obtained between said visit and a latest previous visit of said livestock animal.

6. The system of claim 1, wherein the image processor is arranged to determine a body contour of said live stock animal from said animal part point cloud, and to determine said position of the hind legs and/or of the front legs from said body contour.

7. The system of claim 1, wherein the image processor is arranged to assess an animal posture of said livestock animal from said animal part point cloud, and to discard the animal part point cloud in case the animal part point cloud does not fulfil a posture usefulness criterion.

8. The system of claim 7, wherein said posture usefulness criterion comprises that a highest part of said animal part point cloud is positioned in a posterior part of the livestock animal.

9. The system of claim 7, wherein said posture usefulness criterion comprises that a degree of symmetry of said animal part point cloud with respect to a major axis thereof is at least as high as a symmetry threshold value.

10. The system of claim 1, further comprising an animal identification device, arranged to determine an identity of the individual livestock animal at said visit.

11. A method of monitoring growth of individual livestock animals having front legs and hind legs in a barn environment in which one or more the livestock animals can move about, and which has a floor with bedding material, the method comprising:
 obtaining repeatedly, by means of a 3D camera with a field-of-view that comprises a part of the barn environment in which an individual one of the livestock animals may be present during a visit, a 3D image of said field-of-view;

processing the obtained image by means of an image processor, wherein the processing comprises extracting a 3D point cloud representation of the field-of-view, detecting whether one of said livestock animals is present in said point cloud representation, if yes, then selecting an animal part point cloud of said point cloud representation, determining a position dependent first height information, being a height above the floor of said animal part point cloud, and determining a position of front legs and/or hind legs of said individual livestock animal from said animal part point cloud, if no, then determining a position dependent second height information, being a height above the floor of said bedding material, and determining a height of said individual livestock animal at said visit from said first height information, said second height information, and said position of the front legs and/or of the hind legs.

12. The method according to claim 11, wherein the individual livestock animals are cows.

13. The system of claim 1, wherein the individual livestock animals are COWS.

14. The system of claim 4, wherein the interpolated height is a linearly interpolated height.

15. The system of claim 5, wherein the 3D camera is arranged to obtain 3D images at each visit of said livestock animal.

16. The system of claim 8, wherein the posterior part is a back half of the livestock animal.

\* \* \* \* \*